(12) United States Patent
Valentini et al.

(10) Patent No.: US 8,061,831 B2
(45) Date of Patent: Nov. 22, 2011

(54) INKJET INK AND INK SET

(75) Inventors: Jose Esteban Valentini, West Chester, PA (US); Gregory Paul Morris, Horsham, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 384 days.

(21) Appl. No.: 12/070,825

(22) Filed: Feb. 21, 2008

(65) Prior Publication Data

US 2009/0092755 A1    Apr. 9, 2009

Related U.S. Application Data

(60) Provisional application No. 60/902,591, filed on Feb. 21, 2007.

(51) Int. Cl.
*G01D 11/00* (2006.01)
(52) U.S. Cl. .................. 347/100; 347/95; 106/31.27
(58) Field of Classification Search .................. 347/100, 347/95, 96, 101; 106/31.27, 31.13; 523/160
See application file for complete search history.

(56) References Cited

U.S. PATENT DOCUMENTS

| 5,488,402 A | 1/1996 | Shields et al. |
|---|---|---|
| 5,518,534 A | 5/1996 | Pearlstine et al. |
| 6,053,969 A | 4/2000 | Lauw et al. |
| 2002/0005884 A1* | 1/2002 | Onishi et al. .................. 347/100 |
| 2002/0055619 A1* | 5/2002 | Dietz et al. .................... 534/579 |
| 2003/0167575 A1* | 9/2003 | Connolly et al. ............ 8/115.51 |

OTHER PUBLICATIONS

U.S. Appl. No. 11/472,710, filed Feb. 22, 2007, Jackson et al.

* cited by examiner

*Primary Examiner* — Manish S Shah
(74) *Attorney, Agent, or Firm* — John H. Lamming; Simon L. Xu

(57) ABSTRACT

The present invention pertains to a yellow ink for inkjet printing and, in particular, to a yellow ink containing a combination of specific yellow colorants, namely Direct yellow 169 and Acid Yellow 79. The present invention further pertains to ink set having this yellow ink. The ink and ink set are particularly advantageous for printing on plain and photo glossy paper.

20 Claims, 1 Drawing Sheet

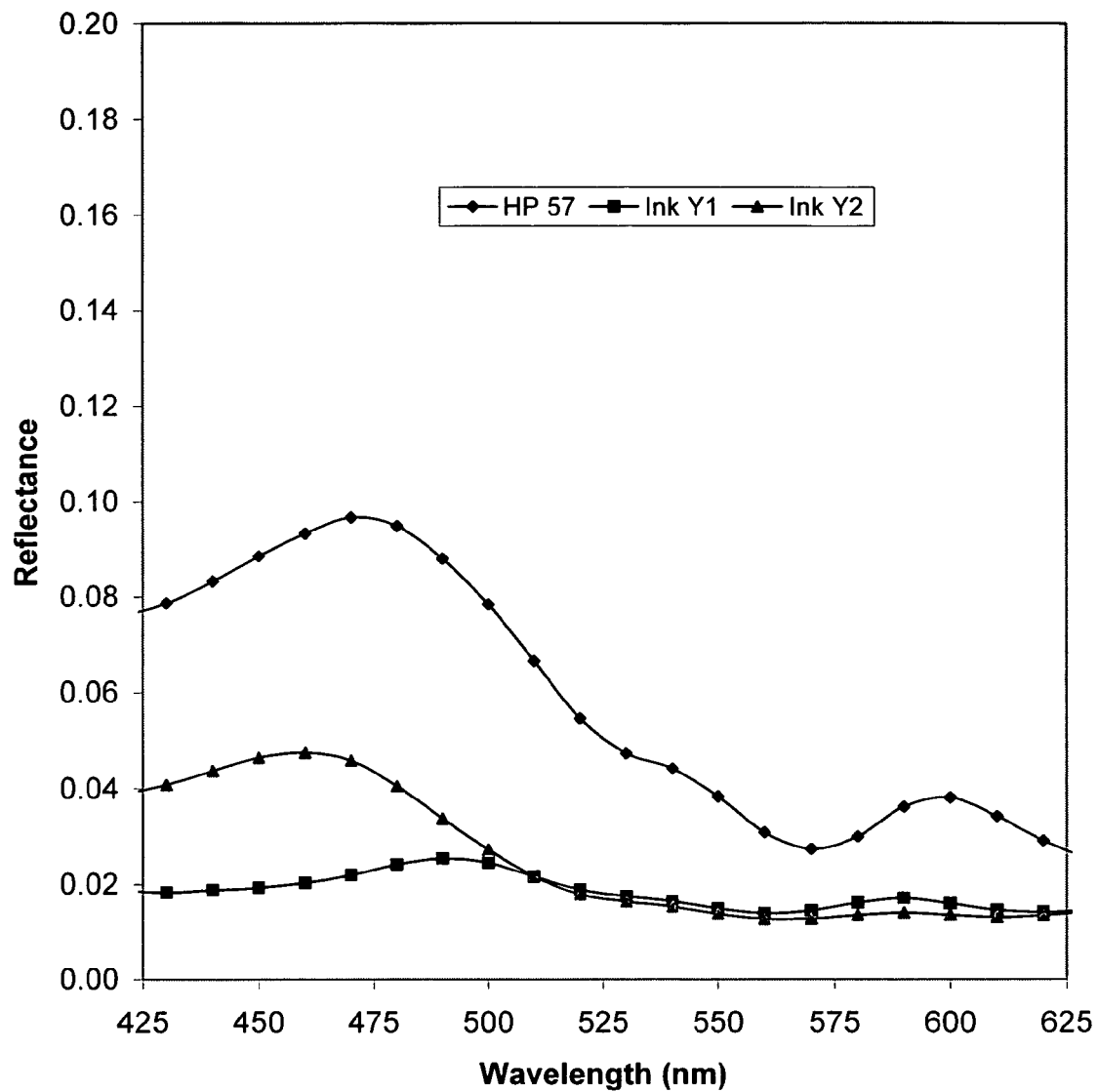

INKJET INK AND INK SET

This application claims priority under 35 U.S.C. §119 from U.S. Provisional Application Ser. No. 60/902,591 (filed Feb. 21, 2007), the disclosure of which is incorporated by reference herein for all purposes as if fully set forth.

BACKGROUND OF THE INVENTION

The present invention pertains to a yellow ink for inkjet printing and, in particular, to a yellow ink comprising a combination of specific yellow colorants. The present invention further pertains to an ink set comprising this yellow ink.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

An ink jet ink set for color printing will generally comprise a cyan, magenta and yellow (CMY) ink, which are referred to as the primary colors. An ink set will also commonly comprise a black ink (CMYK).

A suitable ink should generally exhibit good crusting resistance, good stability, proper viscosity, proper surface tension, good color-to-color bleed alleviation, rapid dry time, consumer-safety and low strike-through.

In addition, the ink set should provide printed images having good color characteristics, such as correct hue and high chroma. Preferably, the ink set will achieve these favorable characteristics on a range of media including plain paper as well as specialty media such as transparency film and coated paper. Also, preferably, the hard copy output is reasonably lightfast.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

The term "bleed" means the invasion of one color into another, once the ink is deposited on the print medium. It can be seen as a ragged border between two adjacent colors. The occurrence of bleed is especially problematic between a black ink and color ink because it is all the more visible. Preferably bleed is minimized or eliminated so that borders between colors are clean and sharp.

U.S. Pat. No. 5,488,402 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent.

U.S. Pat. No. 5,518,534 discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C., wherein the salt is present in an amount effective to alleviate bleed between the first and second inks.

To take advantage of a bleed control mechanism involving salts, it is necessary to have a set of inks that can provide suitable performance characteristics while maintaining reliability in the presence of those salts. U.S. Pat. No. 6,053,969, for example, discloses an ink set with salt compatibility that addresses these needs. A key aspect of this art is the selection of yellow colorant for the yellow ink in this ink set. The difficulties of selecting the yellow colorant are described. For example, DY132 has favorable hue angle, chroma and lightfastness, but is incompatible with precipitating agents (inorganic salts). DY86 has favorable, chroma and lightfastness, but a lower than desired hue angle and no compatibility with precipitating agents. AY23 has favorable hue angle, chroma and compatibility with precipitating agents, but poor lightfastness. AY17 has favorable chroma, lightfastness and compatibility with precipitating agents, but higher than desired hue angle. Ilford Y104 (CAS Number 187674-70-0) has favorable chroma, lightfastness and compatibility with precipitating agents, but lower than desired hue angle. However, a yellow ink with a combination of yellow colorants, namely AY17 and Ilford Y104 achieves all the target attributes, namely a hue angle of 90-95, plain paper chroma of at least 70, good lightfastness and compatibility with inorganic salts.

Co-owned and co-pending application U.S. application Ser. No. 11/472,710 discloses other yellow colorant combinations, namely Acid Yellow 17 with Acid Orange 33 and/or Reactive Yellow 181, that achieve target attributes similar to the AY17/Ilford Y104 combination in U.S. Pat. No. 6,053,969.

However, the aforementioned salt stable yellow inks, and ink sets containing same, have some performance deficiencies on specialty paper. In particular, the regions of the CYM composite black (combination of cyan, magenta and yellow inks) printed on photo quality microporous glossy paper have undesirable haze and hue shift.

A need still exists for improved inks, particularly yellow inks, and ink sets that provide appropriate color, lightfastness and bleed control on both plain paper and specialty paper, such as photoglossy paper, and that exhibit little or no haze or hue shift.

SUMMARY OF THE INVENTION

In one aspect, this invention pertains to a yellow inkjet ink comprising an aqueous vehicle and colorant soluble in the aqueous vehicle, wherein the colorant comprises Direct Yellow 169 (DY169) and Acid Yellow 79 (AY79). In one embodiment, the colorant consists essentially of DY169 and AY79. In yet another embodiment, the colorant consists only of DY169 and AY79.

In another aspect, the present invention pertains to an inkjet ink set comprising the yellow ink set forth above, and at least one or more of inks a-c as follows:

(a) a magenta inkjet ink comprising Acid Red 52 and a second dye selected from the group consisting of AR249, AR289, RR180, RR23, CAS Number 182061-89-8 and mixtures thereof;

(b) a cyan inkjet ink comprising a dye selected from the group consisting of Direct Blue 199, Acid Blue 9 and mixtures thereof; and/or (c) a black inkjet ink comprising carbon black pigment.

Colorants are referred to by their "C.I." designation established by Society Dyers and Colourists, Bradford, Yorkshire, UK and published in *The Color Index*, Third Edition, 1971, unless otherwise indicated.

Preferably, all inks in the ink set are aqueous inks comprising aqueous vehicle. The aqueous vehicle of each ink is selected independently and may be the same as or different from the aqueous vehicle of any other ink in the set.

In preferred embodiment, the yellow ink comprises a bleed control additive, most preferably a metal salt, which inhibits bleed from a black pigment when the inks are printed adjacently.

In yet another aspect the present invention pertains to a method for ink jet printing onto a substrate, comprising the steps of:

(a) providing an ink jet printer that is responsive to digital data signals;
(b) loading the printer with a substrate to be printed;
(c) loading the printer with an inkjet ink or inkjet ink set forth above and as described in further detail below; and
(d) printing onto the substrate using the inkjet ink set in response to the digital data signals.

Preferred substrates include plain paper and photo glossy paper.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

BRIEF DESCRIPTION OF THE DRAWINGS

FIG. 1 shows a graph of reflectance measurements over the range of 425 to 625 nm for three composite black samples.

DETAILED DESCRIPTION OF THE PREFERRED EMBODIMENTS

Yellow Ink

In selecting the colorant for the yellow ink and, in general, for the inks of the ink sets of the present invention, numerous factors need to be considered including, but not limited to, appropriate hue angle and color performance, particularly on plain paper; good lightfastness; and compatibility (stability) in formulations having relatively high inorganic salt.

The yellow colorant should provide a yellow ink having a hue angle on plain paper of from about 83 to about 97, and preferably between about 86 and about 94. It is desirable that the yellow ink exhibit a chroma of at least about 70 (on plain paper). As evidenced by the examples hereinafter, yellow ink in accordance with the present invention comprising a mixture of DY169 and AY79 exhibits the desired hue angle and chroma. It is also compatible with typical levels of metal salts useful for bleed control and has adequate lightfastness.

To achieve the desired yellow hue, the weight ratio of DY169 to AY79 is preferably between about 9:1 to about 1:9, and more preferably between about 1:5 and 5:1.

The hue angle is determined by standard spectrophotometric measurement of printed samples. The hue angle of a specific ink when printed on different papers may vary slightly, so the ratio of dyes can be adjusted within the above ranges by routine optimization so as to achieve the hue value within the desired range.

Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Metal Salt

A metal salt can be incorporated in an ink formulation to help control bleed, and may provide other benefits as well. Use of metal salts in this way has been described, for example, in previously mentioned U.S. Pat. Nos. 5,488,402 and 5,518,534 (the disclosures of which are incorporated by reference herein for all purposes as if fully set forth). The salts are referred to in some art as precipitating agents because they are believed to operate by reacting with the anionic groups (such as carboxyl or sulfonate) associated with a colorant (such as a dye, or a self-stabilized pigment, or the anionic group on a dispersant associated with a dispersed pigment) of another ink in the ink set to form an insoluble complex. However, the present invention is not bound by any particular theory of operation.

The metal salt is substantially soluble in the ink vehicle and the metal can be a monovalent or multivalent cation. Suitable metal cations include, for example:

Group IA metals $Na^{+1}$, $Li^{+1}$, $K^{+1}$, $Rb^{+1}$ and $Cs^{+1}$;
Group IIA metals $Mg^{+2}$, $Ca^{+2}$, $Sr^{+2}$ and $Ba^{+2}$;
Group IIIA metals $Al^{+3}$, $Ga^{+3}$ and $In^{+3}$;
transition metals $Cr^{+3}$, $Mn^{+2}$, $Fe^{+2}$, $Fe^{+3}$, $Co^{+3}$, $Ni^{+2}$, $Cu^{+2}$, $Zn^{+2}$, $Y^{+3}$ and $Cd^{+2}$; and
Lanthanide metals $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $Yb^{+3}$ and $Lu^{+3}$.

Preferred monovalent metal cations include, but are not limited to, $Na^{+1}$ and $K^{+1}$, and preferred multivalent metal cations include, but are not limited to, $Zn^{+2}$, $Mg^{+2}$, $Ca^{+2}$, $Cu^{+2}$, $Ni^{+2}$ and $Fe^{+2}$.

Mixtures of any two or more of metals and metal salts is also suitable.

In the context of the present invention, the amount of metal salt present is expressed on a metal cation ($M^{+n}$) basis in parts per million (ppm), that is parts by weight of $M^{+n}$ per million weight of ink. The amount of $M^{+n}$ present (total) is generally the range of from about 1000 ppm to about 30,000 ppm and, more typically, from about 2000 ppm to about 20,000 ppm.

Suitable metal salts can be the salt of a mineral or organic acid, the appropriate selection of which is readily achieved through routine experimentation. The mineral acid may be hydrochloric acid, phosphoric acid, sulfuric acid, hydrobromic acid, nitric acid, hydriodic acid, hydrofluoric acid. The organic acids may be carboxylic acids, particularly those carboxylic acids substituted with electron withdrawing groups, and organic sulfonic acids. Some examples of such acids include chloroacetic acid, p-toluene sulfonic acid, sulfanilic acid, benzene sulfonic acid, and so forth.

Additives

Other ingredients (additives) may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'', N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70% to about 99.8%, and more typically from about 80% to about 99%. Colorant is generally present in amounts up to about 10%. Percentages are weight percent of the total weight of ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.5 to about 8.

Inkjet Ink Set

The yellow ink of the present invention is advantageously used in an ink set with other dye-based colored inks, such as a magenta and a cyan dye-based ink, wherein the other inks have similar beneficial attributes such as chroma, lightfastness and tolerance to bleed control agents.

A magenta ink preferred for use with the prescribed yellow ink comprises mixture of AR 52 and a second magenta dye selected from the group consisting of AR249, AR289, RR180, RR23, CAS Number 182061-89-8 and mixtures thereof. Most preferred as the second magenta dye are AR249 and CAS Number 182061-89-8. A dye with CAS Number 182061-89-8 is commercially available from Ilford Imaging Group (Ilford M377). The structure of CAS Number 182061-89-8 can be seen from Magenta Formula II in previously incorporated U.S. Pat. No. 6,053,969. The weight ratio of AR52 to the second magenta dye required to achieve a desirable magenta hue is generally from about 1:3 to about 1:8, respectively, when the second dye is either AR249 or CAS Number 182061-89-8.

A cyan ink preferred for use with the prescribed yellow ink comprises a cyan dye selected from the group consisting of DB199, AB9 and mixtures thereof.

The other dye-based inks in the set preferably comprise an aqueous vehicle in which the colorant is soluble. The aqueous vehicle, optional other components and ink properties are similar to, but selected independently of, the yellow ink as described above.

Dye-based inks, including the yellow ink of the present invention, typically have a colorant (dye) content from about 0.1 wt % to about 8 wt % and, more typically, from about 0.5 wt % to about 6 wt %, based on the total weight of the ink. The "dye content" in a given ink refers the total dye present in that ink, whether a single dye species or a combination of two or more dye species.

The dyes are usually in their salt form, such as an alkali metal (Na, K, or Li) or quaternary ammonium salt. Most commonly, the commercially available salt form is sodium. Other salt forms can be made using well-known techniques.

Ink sets may further comprise one or more "gamut-expanding" inks, including different colored inks such as an orange ink, a green ink, a red ink and/or a blue ink, and combinations of full strength and light strengths inks such as light cyan and light magenta.

The yellow ink of the present invention, and any of the preferred magenta and/or cyan dye-based inks just described, are advantageously used in an ink set that further includes a pigmented black ink. It is especially advantageous for the dye-based ink(s) to comprise bleed control agents, such as metal salts, and for the pigment in the black ink to be an anionically-stabilized pigment dispersion that will "crash" or be immobilized on contact with the metal salts in the dye-based colored inks and thereby resist bleeding into the colored areas of a printed image.

The aqueous anionic pigment ink comprises an aqueous vehicle and optionally ingredients (additives) as described above for the yellow ink, and a black pigment stably dispersed in the aqueous vehicle. The black pigment is preferably carbon black.

Pigments, traditionally, are stabilized to dispersion in a vehicle by dispersing agents, such as polymeric dispersants or surfactants. More recently though, so-called "self-dispersible" or "self-dispersing" pigments (hereafter "SDP(s)") have been developed. As the name would imply, SDPs are dispersible in water, or aqueous vehicle, without dispersants. Thus, pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

The dispersant or surface treatment applied to the pigment creates an anionic surface charge ("anionic pigment dispersion"). Preferably, that surface charge is imparted predominately by ionizable carboxylic acid (carboxylate) groups.

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Sources of colorants used in inkjet inks are generally well know to those skilled in the art.

Method of Printing

The method of printing prescribed herein can be accomplished with any suitable inkjet printer. The substrate can be any suitable substrate, but the instant invention is particularly useful for printing on paper, especially "plain" paper and specialty paper such as photo glossy paper.

EXAMPLES

Inks were prepared by mixing the indicated ingredients together and filtering the resulting solution. Water was deionized unless otherwise stated. The dyes used were "inkjet grade" meaning that they were relatively pure and free of extraneous salts. Aerosol OT is a surfactant from Cytec Industries. Byk 348 is a surfactant from Byk Chemie.

Color measurements were made with a commercially available spectrophotometer, in this case a Spectroeye from Gretag-MacBeth. Hue ($h_{ab}$) and chroma ($C^*_{ab}$) values are read directly from the instrument but are based on CIELAB colorspace L*, a* and b* terms according to the following equations: $h_{ab}=\tan^{-1}(b^*/a^*)$ where the angle is adjusted for the appropriate quadrant and $C^*_{ab}=(a^{*2}+b^{*2})^{1/2}$. The measurements and definitions are well known in the art, see for example ASTM Standard E308 and *Principles of Color Technology*, Billmeyer and Saltzman, 3rd Ed., Roy Berns editor, John Wiley & Sons, Inc. (2000).

Reflectance values of the CYM composite black were measured at several wavelengths using a Gregtag densitometer. Dark and black images are associated with low reflectance values.

Inks Y1, Y2, C1 and M1 were prepared according to the formulations in the following tables. Ink referred to as "HP 57" was the Hewlett Packard commercial ink supplied with the HP 57 print cartridge. Inventive ink Y1 was compatible with salts but was not formulated with salt for these examples.

| Ingredient | Ink Y1 (Inventive) | Ink Y2 (comparative) |
| --- | --- | --- |
| DY169 | 1.0 | — |
| AY79 | 2.0 | — |
| AY17 | — | 4.20 |
| AO33 | — | 0.22 |
| 2-pryrolidone | 5.0 | 5.0 |
| Isopropanol | 2.0 | 2.0 |
| Aerosol OT | 0.25 | 0.25 |
| Byk 348 | 0.2 | 0.2 |
| Water (to 100%) | Balance | Balance |

| Ingredients | Ink C1 | Ink M1 |
| --- | --- | --- |
| DB199 | 4.3 | — |
| AR249 | — | 4.5 |
| 2-pryrolidone | 5.0 | 5.0 |
| Isopropanol | 2.0 | 2.0 |
| Aerosol OT | 0.25 | 0.25 |
| Byk 348 | 0.2 | 0.2 |
| Water (to 100%) | Balance | Balance |

Inks were loaded into and printed from a HP 57 cartridge with a Hewlett Packard Photosmart 7760 inkjet printer. Images consisting of blocks of the primary colors and CYM composite black were printed on Staples "Photo Supreme High Gloss" microporous media selecting "HP Photo Glossy" and "Best" as paper type and print quality respectively. The temperature was about 22° C. and relative humidity was about 41%. The chroma and hue angles are summarized in the following table.

| | Microporous Paper | | Plain Paper | |
| --- | --- | --- | --- | --- |
| Ink | $C^*_{ab}$ | $h_{ab}$ | $C^*_{ab}$ | $h_{ab}$ |
| Ink Y1 | 108.5 | 89.0 | 72.9 | 87 |
| Ink Y2 | 89.3 | 89.0 | 62.1 | 89 |
| HP 57 yellow | 96.3 | 89.0 | 65.1 | 90 |
| Ink M1 | 74.5 | 356 | — | — |
| HP 57 magenta | 71.0 | 345 | — | — |
| Ink C1 | 66.1 | 235 | — | — |
| HP 57 cyan | 67.1 | 225 | — | — |

The reflectance measurements of the CYM composite black prints are summarized in FIG. 1. Referring to FIG. 1, the "HP 57" is a composite of commercial HP 57 cyan, magenta and yellow inks; the "Ink Y1" is a composite of inks Y1, C1 and M1; the "Ink Y2" is a composite of inks Y1, C1 and M1. It can be seen that the inventive Ink Y1 composite black has low reflectance throughout the entire range of wavelengths 425 nm to 625 nm. This quantifies what can be visually, which is, the ink set with the inventive yellow ink gives a clear (non-hazy), "true" black color. By contrast, the HP 57 composite black has high reflectance at all wavelengths (hazy appearance) and the reflectance is unequal over the 425 nm to 625 nm range resulting in a bluish, rather than black, hue. Likewise, the comparative Ink Y2 composite black is also hazy and has a bluish hue shift.

The results demonstrate that the inventive ink and ink set has good color on both plain paper and specialty paper, and that an advantageous composite black is obtained on microporous paper.

The invention claimed is:

1. A yellow inkjet ink for printing on porous and microporous surfaces comprising an aqueous vehicle and colorant soluble in the aqueous vehicle, wherein the colorant comprises Direct Yellow 169 (DY169) and Acid Yellow 79 (AY79).

2. The ink of claim 1, wherein the weight ratio of Direct Yellow 169 to Acid Yellow 79 is from about 9:1 to about 1:9.

3. The ink of claim 1, wherein the weight ratio of Direct Yellow 169 to Acid Yellow 79 is from about 5:1 to about 1:5.

4. The ink of claim 1, having a hue angle of from about 83 to about 97.

5. The ink of claim 1, having a hue angle of from about 86 to about 94.

6. The ink according to any one of claims 1 through 5, further comprising a metal salt.

7. The ink according to claim 6, wherein the colorant consists essentially of Direct Yellow 169 and Acid Yellow 79.

8. The ink according to claim 6, wherein the colorant consists only of Direct Yellow 169 and Acid Yellow 79.

9. The ink of claim 6, wherein the metal salt comprises a monovalent metal cation, a multivalent metal cation, or combinations of salts formed therefrom.

10. The ink of claim 9, wherein the monovalent metal cation is selected from $Na^{+1}$ and $K^{+1}$, and the multivalent metal cation is selected from $Zn^{+2}$, $Mg^{+2}$, $Ca^{+2}$, $Cu^{+2}$, $Ni^{+2}$ and $Fe^{+2}$.

11. An inkjet ink set comprising a yellow ink according to claim 1 and at least one of inks (a)-(c) as follows:
    (a) a magenta inkjet ink comprising Acid Red 52 and a second dye selected from the group consisting of AR249, AR289, RR180, RR23, M377 and mixtures thereof;
    (b) a cyan ink comprising a dye selected from the group consisting of Direct Blue 199, Acid Blue 9 and mixtures thereof; and
    (c) a black inkjet ink comprising carbon black pigment.

12. A method for ink jet printing onto a substrate, comprising the steps of:
    (a) providing an inkjet printer that is responsive to digital data signals;
    (b) loading the inkjet printer with a substrate to be printed;
    (c) loading the inkjet printer with an inkjet ink set as set forth in claim 9; and
    (d) printing onto the substrate using the inkjet ink set in response to the digital data signals.

13. The method of claim 12, wherein the substrate is plain paper or photo glossy paper.

14. The inkjet ink set of claim 11, further comprising a metal salt.

15. The inkjet ink set of claim 14, wherein the colorant consists essentially of Direct Yellow 169 and Acid Yellow 79.

16. The inkjet ink set claim 14, wherein the colorant consists only of Direct Yellow 169 and Acid Yellow 79.

17. A method for ink jet printing onto a substrate, comprising the steps of:
    (a) providing an inkjet printer that is responsive to digital data signals;
    (b) loading the inkjet printer with a substrate to be printed;
    (c) loading the inkjet printer with an inkjet ink as set forth in claim 1; and
    (d) printing onto the substrate using the inkjet ink in response to the digital data signals.

18. The method of claim 17, wherein the substrate is plain paper or photo glossy paper.

19. The ink of claim 1, wherein the surface is a porous surface.

20. The ink of claim 1, wherein the surface is a microporous surface.

* * * * *